(12) United States Patent
Kurosawa

(10) Patent No.: US 6,692,433 B1
(45) Date of Patent: Feb. 17, 2004

(54) LIGHT SOURCE DEVICE FOR ENDOSCOPE

(75) Inventor: Hidehito Kurosawa, Tokyo (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/670,699

(22) Filed: Sep. 28, 2000

(30) Foreign Application Priority Data

Oct. 5, 1999 (JP) .......................................... P11-283842

(51) Int. Cl.$^7$ ................................................. A61B 1/06
(52) U.S. Cl. ........................ 600/180; 600/178; 600/160
(58) Field of Search ............................... 600/174, 180, 600/264, 160

(56) References Cited

U.S. PATENT DOCUMENTS

| | | | |
|---|---|---|---|
| 4,322,129 A | | 3/1982 | Takahashi et al. |
| 4,444,462 A | * | 4/1984 | Ono et al. ................ 350/96.25 |
| 4,569,334 A | * | 2/1986 | Ohshiro .......................... 128/6 |
| 4,572,164 A | * | 2/1986 | Yoshida et al. ................. 128/6 |
| 4,671,630 A | * | 6/1987 | Takahashi .................... 350/574 |
| 4,704,660 A | * | 11/1987 | Robbins ...................... 362/324 |
| 4,706,657 A | * | 11/1987 | Miyagi ........................... 128/6 |
| 4,710,807 A | * | 12/1987 | Chikama ...................... 358/98 |
| 4,729,018 A | * | 3/1988 | Watanabe et al. ............. 358/98 |
| 4,834,071 A | * | 5/1989 | Hosoi et al. ..................... 128/6 |
| 4,855,875 A | * | 8/1989 | Onose et al. ................. 362/32 |
| 4,878,112 A | * | 10/1989 | Ieoka ........................... 358/98 |
| 4,885,635 A | * | 12/1989 | Kimura et al. ................. 358/98 |
| 4,924,852 A | * | 5/1990 | Suzuki et al. ................... 128/4 |
| 4,924,856 A | * | 5/1990 | Noguchi ......................... 128/6 |
| 4,959,710 A | * | 9/1990 | Uehara et al. ................. 358/98 |
| 4,963,960 A | * | 10/1990 | Takami ........................ 358/98 |
| 4,967,269 A | * | 10/1990 | Sasagawa et al. ............. 358/98 |
| 4,983,019 A | * | 1/1991 | Ikuno et al. .................. 350/313 |
| 5,224,467 A | * | 7/1993 | Oku ............................... 128/4 |
| 5,237,403 A | * | 8/1993 | Sugimoto et al. .............. 358/98 |
| 5,277,172 A | * | 1/1994 | Sugimoto ....................... 128/6 |
| 5,596,666 A | * | 1/1997 | Miyano et al. .............. 385/118 |
| 6,231,503 B1 | * | 5/2001 | Sugimoto et al. ........... 600/178 |
| 6,414,710 B1 | * | 7/2002 | Takahashi et al. ............ 348/69 |
| 6,545,703 B1 | * | 4/2003 | Takahashi et al. ............ 348/69 |

\* cited by examiner

*Primary Examiner*—Henry Bennett
*Assistant Examiner*—Nihir Patel
(74) *Attorney, Agent, or Firm*—Greenblum & Bernstein, P.L.C.

(57) ABSTRACT

A light source device comprises a pair of aperture blades, which opens and closes an optical path through which illumination light radiated from a light source passes so that the amount of the illumination light entering a light guide fiber bundle of the endoscope is adjusted. A guide slot is formed in each of the aperture blades, and an engaging pin is engaged with each of the guide slots. A tension coil spring connects the aperture blades to urge the aperture blades always in a direction in which the aperture blades opens or closes, so that the engaging pin is always engaged with an edge of the guide slot.

4 Claims, 5 Drawing Sheets

LIGHT SOURCE DEVICE FOR ENDOSCOPE

BACKGROUND OF THE INVENTION

1. Field of the Invention

The present invention relates to a light source device for an endoscope, which supplies illumination light to a light guide provided in the endoscope.

2. Description of the Related Art

Usually, a light source device for an endoscope is disposed in an optical path of illumination light which is radiated from a light source (or a lamp) and enters the light guide of the endoscope. The light source device has aperture members for blocking part of the illumination light. Namely, the aperture members are moved to adjust the amount of illumination light entering the light guide.

The aperture members are rotatably connected to each other at a rotation axis, like scissors, in such a manner that the optical path of the illumination light is formed between the aperture members. A guide slot is formed in each of the aperture members, which are positioned in such a manner that the guide slots overlap each other. An engaging pin, which is fixed to a stationary plate, is inserted into the overlapped portion of the guide slots. Thus, when the rotation axis is moved by an arm rotated via a stepper motor, for example, the aperture members are opened or closed, so that the amount of the illumination light is adjusted.

A clearance is formed between the engaging pin and each of the guide slots, so that the engaging pin can slide smoothly along each of the guide slots. Accordingly, when the rotation direction of each of the aperture members is reversed, the aperture members do not start to rotate until the engaging pin is engaged with an inner wall of the guide slot, which is opposite to another wall of the guide slot.

Thus, when the movement of the aperture members are changed between the opening and closing directions, the amount of the illumination light is hardly changed regardless of the rotation of the stepper motor, and thus the illumination light cannot be controlled with accuracy.

SUMMARY OF THE INVENTION

Therefore, an object of the present invention is to provide a light source device for an endoscope, which can control the illumination light with high accuracy, even when the aperture members are moved from the opening to the closing direction and vice versa.

According to the present invention, there is provided a light source device for an endoscope, with a light guide through which illumination light passes, the light source device comprising a light source, an aperture mechanism, a moving mechanism and an urging member.

The light source radiates the illumination light, which is led to an end portion of the light guide. The aperture mechanism is disposed between the light source and the end portion. The aperture mechanism is movable and has a guide portion with which an engaging pin is engaged. The moving mechanism moves at least one of the aperture mechanism and the engaging pin, so that the aperture mechanism is open or closed to adjust the amount of the illumination light led to the end portion. The urging member always urges the aperture mechanism in a direction in which the aperture mechanism is opened or closed.

Preferably, the aperture mechanism comprises a pair of aperture members to sandwich an optical path through which the illumination light passes. The urging member may urge the pair of aperture members in a direction in which the pair of aperture members is closed, so that play or backlash is eliminated between the engaging pin and the guide portion. In the other example, the urging member may urge the pair of aperture members in an open direction.

Preferably, the urging member comprises a coiled tension spring pulling the pair of aperture members toward each other. The urging member may comprise a coiled compression spring pushing the pair of aperture members away from each other. Due to the coil spring, the structure of the light source device is simple.

The pair of aperture members may be rotatably connected to each other about a common axis and the engaging pin is fixed to a stationary member. In this construction, the moving mechanism moves the common axis, so that the pair of aperture members is rotated about the common axis to the open and close positions. The guide portions of the pair of aperture members are guide slots overlapping each other and the engaging pin is inserted in the overlapped portion of the guide slots.

Further, according to the present invention, there is provided a light source device for an endoscope, in which aperture members are provided in an optical path through which illumination light, radiated from a light source, passes and enters a light guide of the endoscope, the aperture members having guide slots with which an engaging pin is engaged, at least one of the aperture members and the engaging pin being moved so that the aperture members are open or closed to adjust the amount of the illumination light, characterized in that an urging member is provided to always urge the aperture members in a direction in which the aperture members are opened or closed.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
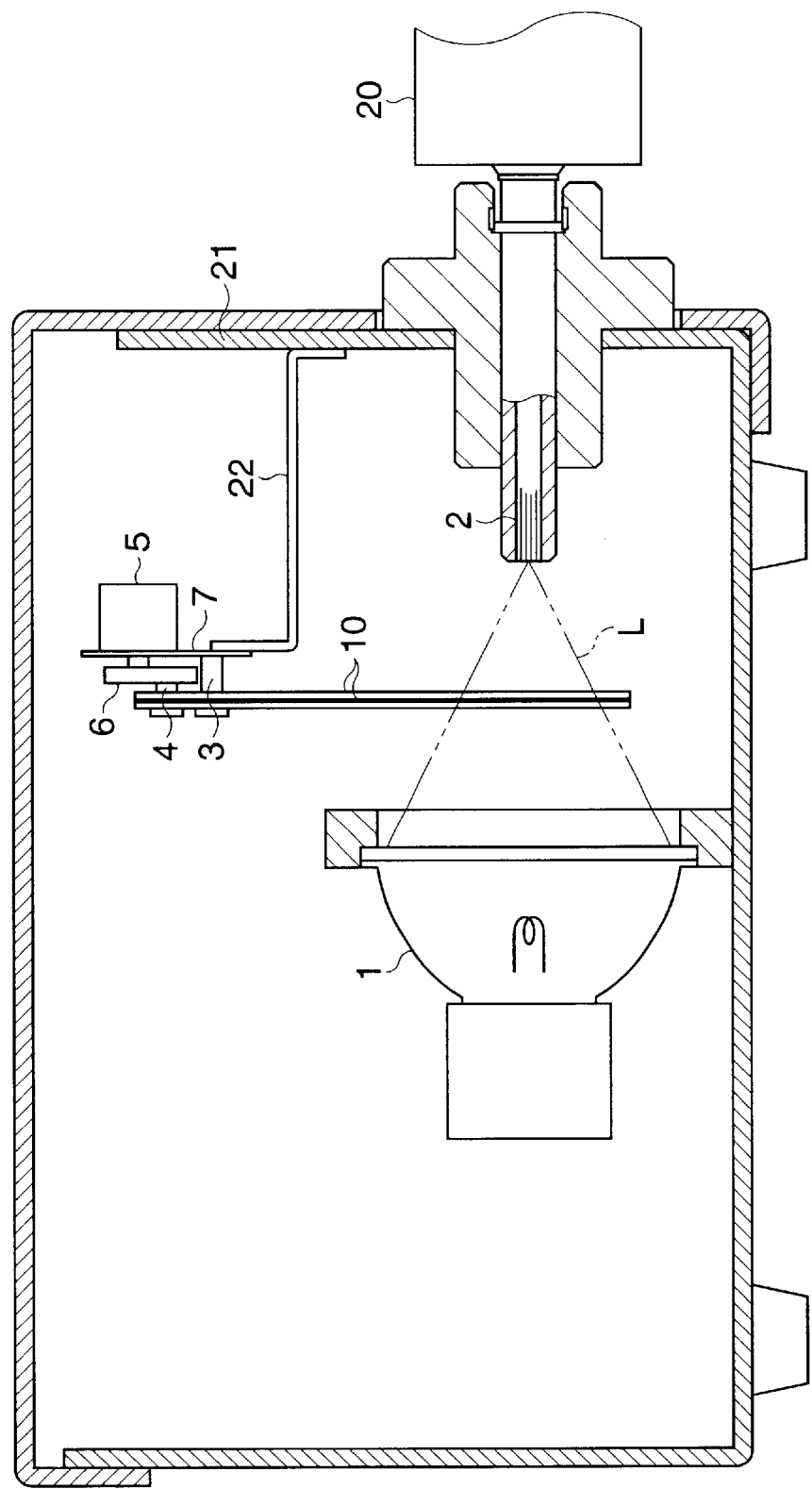
FIG. 1 is a side sectional view showing a light source device to which an embodiment of the present invention is applied.

The present invention will be described below with reference to the embodiments shown in the drawings.

FIG. 1 shows a light source device for an endoscope, in which a light guide connector 20 of the endoscope is detachably connected to the light source device.

A light source lamp 1 is disposed to face an incident end surface of a light guide fiber bundle 2, which is provided at a projecting portion of the light guide connector 20, so that illumination light radiated from the light source lamp 1 is condensed and enters the light guide fiber bundle 2. The illumination light passes through the light guide fiber bundle 2 and is led to the other end.

A pair of aperture blades 10, which is driven to open and close by a stepper motor 5, is disposed between the light source lamp 1 and the incident end surface of the light guide fiber bundle 2. Thus, a part of the illumination light radiated from the light source lamp is blocked by the aperture blades 10 so that the amount of illumination light led to the light guide fiber bundle 2 is controlled.

Figure 2:
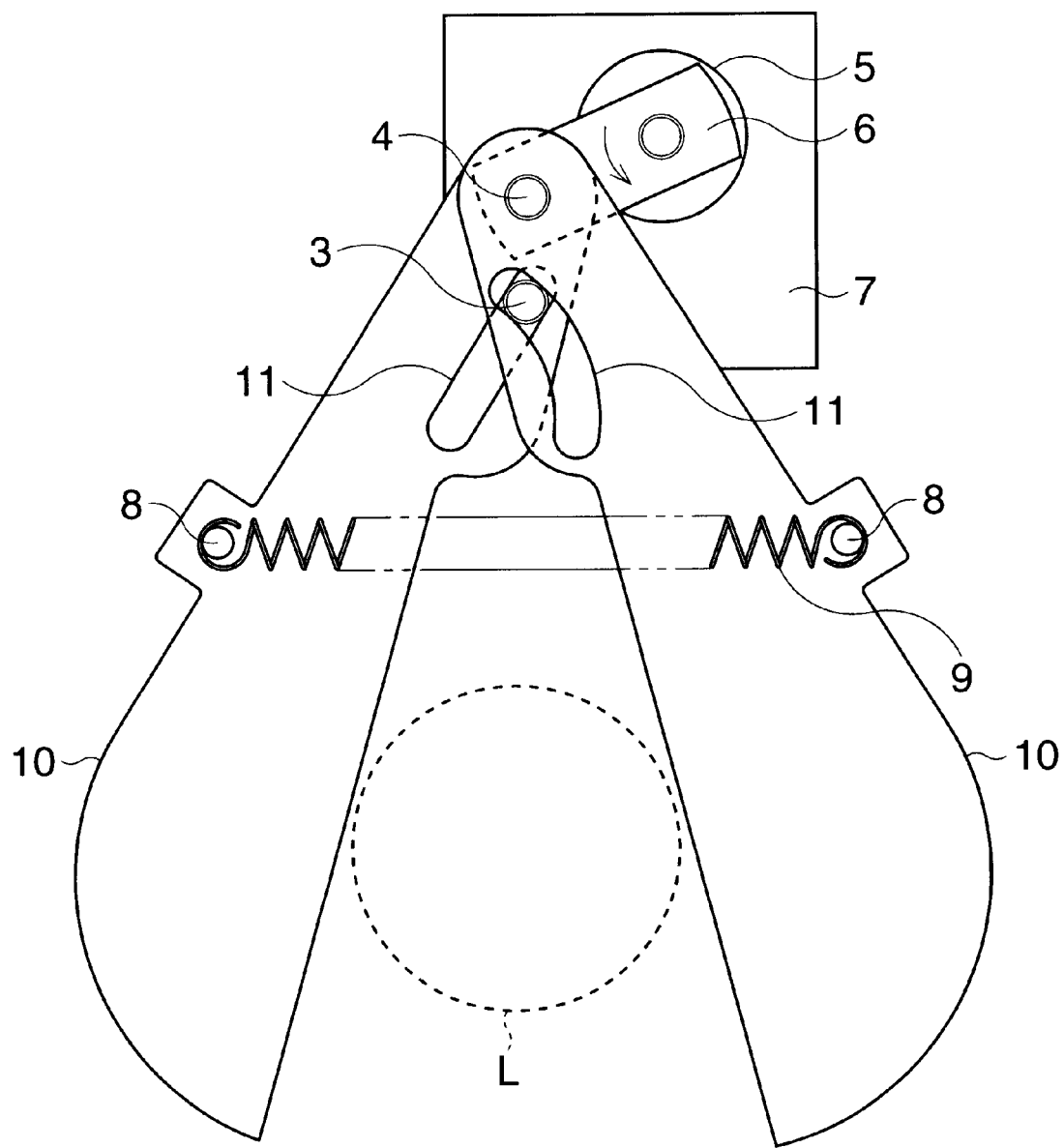
FIG. 2 is a front view of an aperture mechanism including aperture blades positioned in the fully open condition.
Figure 3:
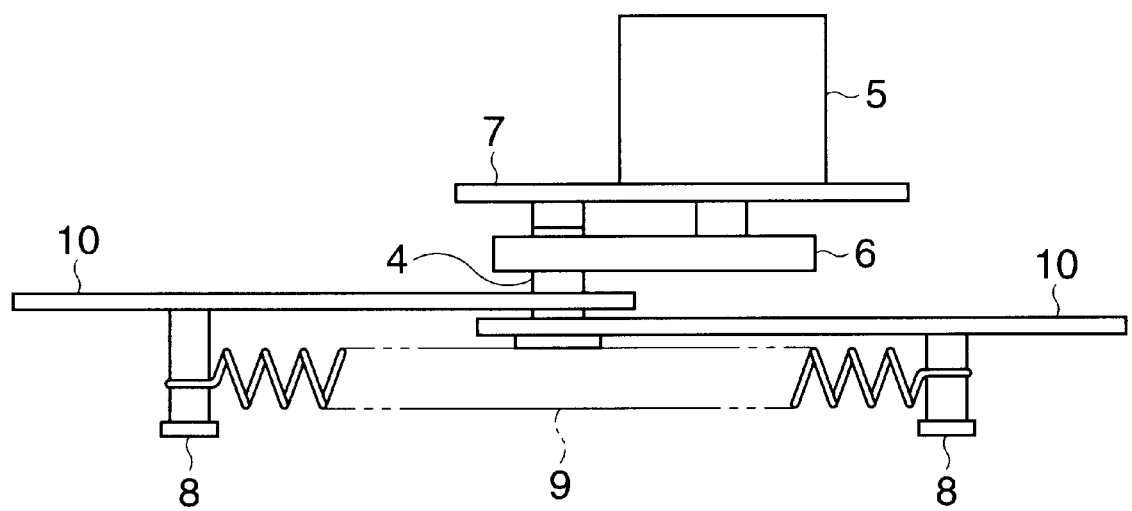
FIG. 3 is a plan view of the aperture mechanism.

FIGS. 2 and 3 are a front view and a plan view of an aperture mechanism including the aperture blades 10, respectively. As understood from the drawings, the pair of aperture blades 10 is disposed to sandwich an optical path L through which the illumination light passes. The pair of aperture blades 10 is rotatably connected to each other about a pivot shaft (i.e., the common axis) 4, fixed at an end portion of an arm 6, which is rotated by a stepper motor 5.

The stepper motor 5 is fixed to a stationary plate 7, which is rigidly supported by a frame 21 through a support member 22, as shown in FIG. 1. An engaging pin 3 is fixed to the stationary plate 7, and each of the aperture blades 10 is provided with a guide slot 11 with which the engaging pin 3 is engaged. The guide slot 11 is extended substantially along the longitudinal direction of the aperture blade 10, and has a breadth greater than the diameter of the engaging pin 3. The guide slots 11 formed in the aperture blades 10 overlap each other and the engaging pin 3 is inserted in the overlapped guide slots 11.

A spring attaching pin 8 is fixed on each of the aperture blades 10. A tension coil spring 9 is provided between the aperture blades 11 in such a manner that the tension coil spring 9 does not interfere with the optical path L. Both ends of the spring 9 are connected to the spring attaching pins 8, so that the pair of the aperture blades 11 is always urged in a direction in which the aperture blades 11 are closed. In other words, the aperture blades 11 are always pulled toward each other. Namely, a neutral length of the spring 9, in which no external force acts on the spring 9, is shorter than the length between the spring attaching pins 8 in the closed condition shown in FIG. 4.

Figure 4:
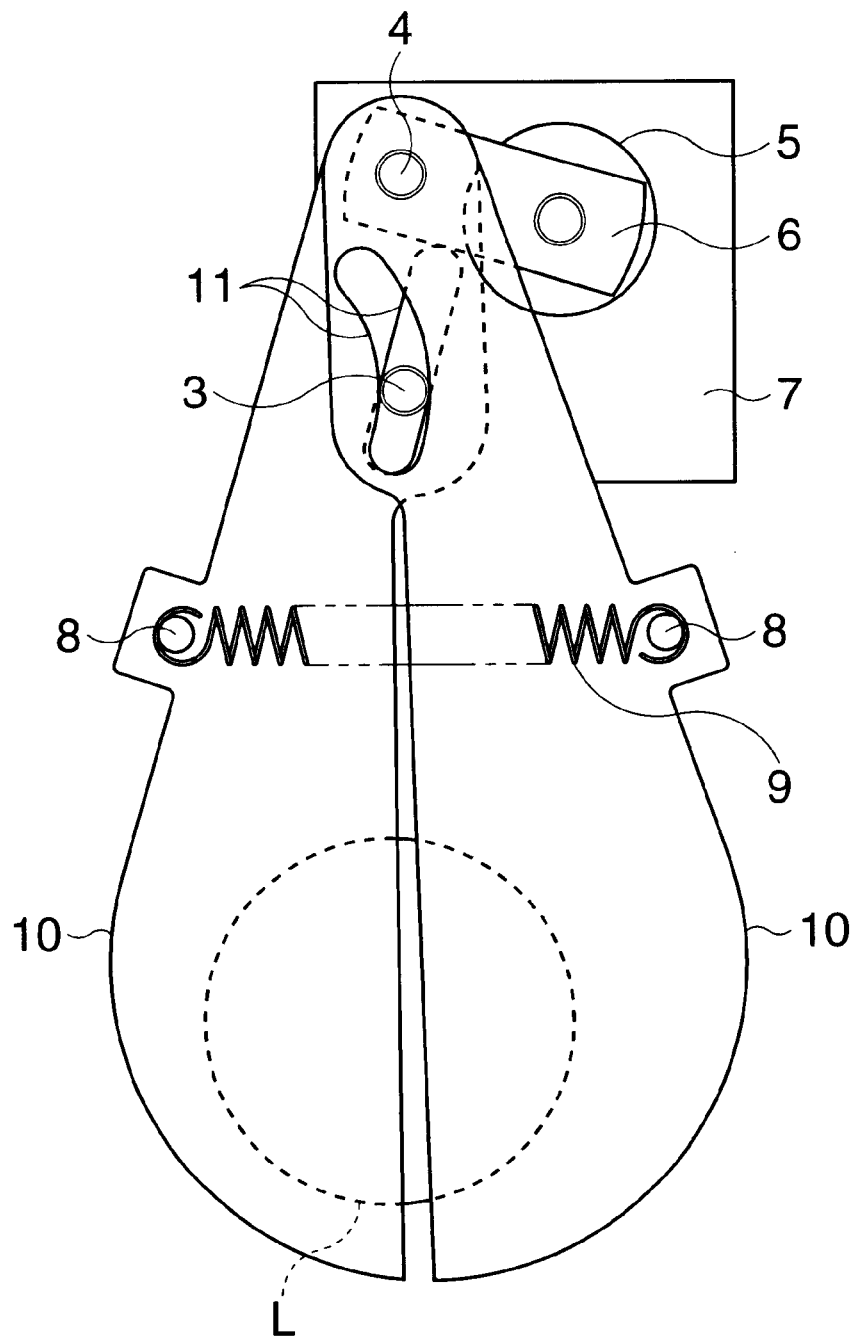
FIG. 4 is a front view of the aperture mechanism including the aperture blades positioned immediately before the fully closed condition.

The stepper motor 5 is driven so that the output shaft of the motor 5 is rotated by a fraction of a revolution, which causes the pivot shaft 4, provided at the end portion of the arm 6, to move so that the aperture blades 11 are moved. The engaging pin 3, fixed onto the stationary plate 7, is stationary, and therefore the guide slots 11 are moved along the engaging pin 3, so that the aperture blades 10 are rotated about the pivot pin 4 to open and close. Thus, the amount of the illumination light on the optical path is changed. Note that FIG. 2 shows the fully open condition of the aperture blades 10 and FIG. 4 shows the closed condition of the aperture blades 10. In the closed condition, the aperture blades 10 do not completely close the optical path L.

Figure 5:
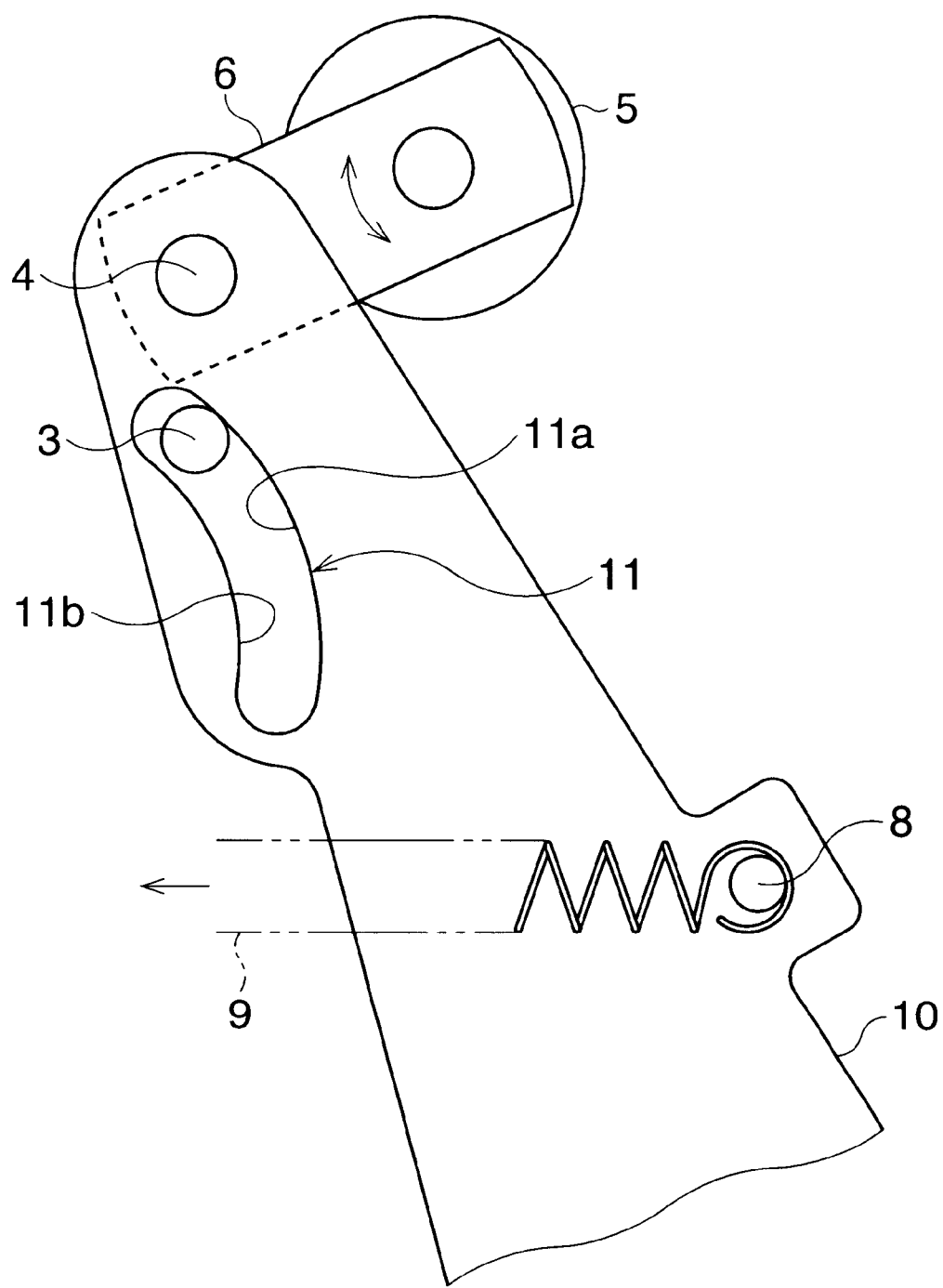
FIG. 5 is an enlarged front view showing a portion in which a engaging pin is engaged with a guide slot.

In the opening and closing operations, the pair of aperture blades 10 is always urged by the coil spring 9 in a closing direction. Therefore, as shown in FIG. 5, the engaging pin 3 is always in contact with an outer wall 11a of the guide slot 11.

Namely, in either case in which the moving direction of the aperture blades 10 is changed from the opening to the closing direction, or in which the moving direction is changed from the closing to the opening direction, the engaging pin is always kept in contact with the outer wall 11a of the guide slot 11. Accordingly, the aperture blades 10 react even to minuscule reversing movement of the stepper motor. Therefore, control of the amount of the illumination light entering the light guide fiber bundle 2 is performed with high accuracy.

Note that the tension coil spring 9 can be replaced with the another urging member including a leaf spring and the like.

Further, the aperture blades 10 may be always urged in an open direction by a compression coil spring. In this structure, a neutral length of the compression coil spring, in which no external force acts on the compression coil spring, is longer than the length between the spring attaching pins 8 in the fully open condition shown in FIG. 2. Therefore, in the open and close operations of the aperture blades 10, the engaging pin 3 is always engaged with an inner wall 11b (see FIG. 5) of the guide slot 11.

Furthermore, the pivot pin 4 may be stationary, and the engaging pin 3 may be moved by the stepper motor 5.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Applications No. 11-283842 (filed on Oct. 5, 1999) which is expressly incorporated herein, by reference, in its entirety.

What is claimed is:

1. A light source device for an endoscope provided with a light guide through which illumination light passes, said light source device comprising:

a light source that radiates said illumination light, which is led to an end portion of said light guide;

an aperture mechanism that is disposed between said light source and said end portion, said aperture mechanism being movable and having a guide portion with which an engaging pin is engaged;

a moving mechanism that moves at least one of said aperture mechanism and said engaging pin, so that said aperture mechanism is open or closed to adjust the amount of said illumination light led to said end portion; and an urging member that always urges said aperture mechanism in a direction in which said aperture mechanism is opened or closed;

wherein said aperture mechanism comprises a pair of aperture members movable apart and together in opening and closing directions, respectively, to sandwich an optical path through which said illumination light passes; and wherein said guide portions of said pair of aperture members comprise guide slots overlapping each other, each said guide slot extending in a longitudinal direction along a respective said aperture member, each said longitudinal direction substantially transverse to the opening and closing directions, said engaging pin is inserted in the overlapped portion of said guide slots, and said urging member always causes said engaging pin to engage said guide slots.

2. The device according to claim 1, wherein said urging member urges said pair of aperture members in a direction in which said pair of aperture members is closed.

3. The device according to claim 2, wherein said urging member comprises a coil spring pulling said pair of aperture members toward each other.

4. The device according to claim 2, wherein said pair of aperture members is rotatably connected to each other about a common axis and said engaging pin is fixed to a stationary member, said moving mechanism moving the common axis, so that said pair of aperture members is rotated about the common axis to open and close.

* * * * *